United States Patent
Standifer

(10) Patent No.: US 10,787,049 B2
(45) Date of Patent: Sep. 29, 2020

(54) SELF-ADJUSTING FIFTH WHEEL HITCH PEDESTAL ANCHOR BUSHINGS

(71) Applicant: Ford Global Technologies, LLC, Dearborn, MI (US)

(72) Inventor: Cliff Standifer, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 238 days.

(21) Appl. No.: 15/902,592

(22) Filed: Feb. 22, 2018

(65) Prior Publication Data
US 2019/0255896 A1 Aug. 22, 2019

(51) Int. Cl.
*B60D 1/01* (2006.01)
*B60D 1/44* (2006.01)
*B60D 1/48* (2006.01)
*B60D 1/52* (2006.01)

(52) U.S. Cl.
CPC ............... *B60D 1/015* (2013.01); *B60D 1/44* (2013.01); *B60D 1/488* (2013.01); *B60D 1/52* (2013.01)

(58) Field of Classification Search
CPC .......... B60D 1/015; B60D 1/02; B60D 1/025; B60D 1/44; B60D 1/485; B60D 1/488; B60D 1/52; B62D 53/08; B62D 53/0807; B62D 53/0828
See application file for complete search history.

(56) References Cited

U.S. PATENT DOCUMENTS

| | | | |
|---|---|---|---|
| 3,622,715 A | 11/1971 | Jukes | |
| 3,960,388 A | 6/1976 | Strader et al. | |
| 6,182,996 B1 | 2/2001 | Koetter et al. | |
| 7,793,968 B1 * | 9/2010 | Withers | B60D 1/015 280/415.1 |
| 8,220,818 B1 * | 7/2012 | Pulliam | B62D 53/0814 280/441 |
| 8,439,387 B1 * | 5/2013 | Connell | B62D 53/08 280/438.1 |
| 9,499,017 B2 | 11/2016 | McCoy et al. | |

(Continued)

OTHER PUBLICATIONS

Ford Custom Accessories, Towing Equipment, Owner's Manual, Copyright 2016, 21 Pages.

(Continued)

*Primary Examiner* — Jacob D Knutson
*Assistant Examiner* — Maurice L Williams
(74) *Attorney, Agent, or Firm* — David Coppiellie; Brooks Kushman P.C.

(57) ABSTRACT

A fifth wheel assembly for a pick-up truck having a frame disposed below the truck bed that supports a plurality of receptacles that define oblong openings. The fifth wheel assembly includes a fifth wheel hitch, and a plurality of bushings including a boss portion having a cylindrical protrusion on an upper surface and an oblong protrusion on a lower surface. The locations of the bushings are sells-adjusting to facilitate orienting the oblong protrusions to be inserted into the oblong openings. Jam nuts are assembled to the cylindrical protrusion of each of the bosses that are tightened to fix the position of the bosses. T-pins have an oblong head oriented in alignment with the oblong protrusions when inserted into the oblong openings in an unlocked position. The T-pins are pivoted to a locked position after being inserted through the oblong openings.

17 Claims, 6 Drawing Sheets

(56) References Cited

U.S. PATENT DOCUMENTS

| | | | | |
|---|---|---|---|---|
| 2003/0209878 A1* | 11/2003 | Lindenman | ............ | B62D 53/08 |
| | | | | 280/433 |
| 2005/0001408 A1* | 1/2005 | Irgens | ...................... | B60D 1/06 |
| | | | | 280/511 |
| 2005/0146116 A1* | 7/2005 | Lindenman | ............ | B62D 53/08 |
| | | | | 280/433 |
| 2013/0193671 A1* | 8/2013 | McCoy | ................... | B60D 1/28 |
| | | | | 280/495 |
| 2013/0307248 A1* | 11/2013 | McCoy | ................. | B60D 1/015 |
| | | | | 280/495 |
| 2015/0028565 A1* | 1/2015 | Bowe | .................... | B60D 1/025 |
| | | | | 280/491.5 |
| 2015/0090847 A1* | 4/2015 | McCoy | ................... | B60D 1/28 |
| | | | | 248/205.1 |

OTHER PUBLICATIONS

Admitted Prior Art, Ford Super Duty 5th Wheel, Anchor Bushing Overview, 3 Pages.

\* cited by examiner

SELF-ADJUSTING FIFTH WHEEL HITCH PEDESTAL ANCHOR BUSHINGS

TECHNICAL FIELD

This disclosure relates to adapters for assembling a fifth wheel trailer hitch to a pick-up truck bed.

BACKGROUND

Fifth wheel trailer hitches are used to maximize the towing capacity of vehicles by securing the trailer hitch above the rear axle of a truck. Pick-up trucks have a truck bed that may accommodate a fifth wheel trailer hitch. The fifth wheel trailer hitch may be assembled to a hitch mounting frame attached to the top of the truck bed but the fifth wheel trailer hitch obstructs the surface of the truck bed when the fifth wheel trailer hitch is secured to the mounting frame.

A rigid H-frame assembly having puck-shaped receptacles may be provided as an original equipment option below a pick-up truck bed. Mounting the H-frame assembly below the truck bed, avoids obstructing the surface of the truck bed. However, due to tolerances and variation in the location of the anchor bushings attached to the base of the legs of the fifth wheel trailer hitch and the fixed location of the puck-shaped receptacles attached below the truck bed, the fifth wheel trailer hitch may be difficult or impossible to attach to the puck-shaped receptacles.

Anchor bushings are known that include slots elongated in the transverse, or cross-car, direction. However, the slots only provide for adjusting the anchor bushing in the cross-car direction but do not permit adjusting the bushing in the longitudinal, or fore-and-aft, direction.

This disclosure is directed to solving the above problems and other problems as summarized below.

SUMMARY

According to one aspect of this disclosure, a fifth wheel assembly for a truck bed is disclosed that has a receptacle defining an oblong opening attached below the truck bed. The fifth wheel assembly includes a fifth wheel hitch pedestal and a bushing. The bushing includes a boss having an oblong protrusion on a lower side and a guide pin. The boss and guide pin limit movement when adjusting the location of the bushing fore-and-aft and laterally. The primary purpose of the guide pin is to limit pivotal movement of the bushing and to align the oblong protrusion of the bushing with the oblong opening of the receptacle.

The bushing is designed to allow the bushings to float as needed to accommodate tolerance stack-up but minimize angular offset relative to the mating receptacles. Allowing the bushing to rotate freely would make it more difficult to be aligned with the oblong opening in the receptacle.

According to other aspects of this disclosure, the fifth wheel hitch pedestal includes a base plate defining a first hole that receives the boss and a second hole that receives the guide pin. The fifth wheel assembly may further comprise a jam nut assembled to a cylindrical protrusion of the boss on top of the base plate. The jam nut is tightened to fix the boss within the first hole defined by the base plate.

The fifth wheel assembly may further comprise a T-pin received in a central opening defined by the boss. The T-pin is pivoted between a locked position and an unlocked position. The T-pin has an oblong head oriented in alignment with the oblong protrusion when the oblong protrusion is inserted into the oblong opening. A handle is secured to the T-pin above the base plate that is adapted to pivot the oblong head from the unlocked position to the locked position after passing through the oblong opening. The oblong head engages a shoulder provided on the receptacle in the locked position.

The bushing may include a teardrop-shaped plate that has a partially circular portion and a V-shaped portion. The boss is provided on the partially circular portion and the guide pin is provided on the V-shaped portion.

According to another aspect of this disclosure, a fifth wheel assembly is disclosed for a truck bed having a frame disposed below the truck bed that supports a plurality of receptacles that each define oblong openings. The fifth wheel assembly includes a fifth wheel hitch, and a plurality of bushings each including a boss having a cylindrical protrusion on an upper surface and an oblong protrusion on a lower surface. A guide pin and the boss control movement of the bushing when self-adjusting the location of the boss to orient the oblong protrusion to be received in one of the oblong openings.

The fifth wheel hitch may include right and left side base plates that are each attached to the hitch. Each base plate defines a pair of first holes that receive one of the bosses and a pair of second holes that receive one of the guide pins. The first holes are larger than the bosses, and the bushings move the bosses within the first holes in lateral and fore-and-aft directions while the guide pins move within the second holes to limit movement of the bushings.

The guide pins may be cat's eye shaped pins having two pointed ends and two sides. The fifth wheel hitch may define guide pin receiving holes for receiving one of the guide pins with clearance spaces being defined between the two sides and the guide pin receiving holes. The guide pins move within the guide pin receiving holes to limit pivotal movement of the bushings and to align the oblong protrusion of the bushing with the oblong opening of the receptacle.

According to another aspect of this disclosure, an anchor bushing is disclosed for assembling a fifth wheel hitch on an upper side of a truck bed to a hitch receptacle bracket assembled to a lower side of the truck bed. The receptacle bracket defines an oblong receiver opening, and the fifth wheel hitch has a base plate defining a boss receiving opening and a guide pin receiving opening. The anchor bushing comprises a bushing including a plate portion, a boss and a guide pin at a location spaced from the boss. A lower portion of the boss includes an oblong protrusion. A jam nut is assembled to the boss on the upper side of the base plate. The boss is retained in the boss receiving opening of the plate. A T-pin having an oblong head is assembled into an opening defined by the boss with the oblong head below the oblong protrusion of the boss. A distal end of the T-pin extends above the jam nut. A lever is adapted to engage the distal end of the T-pin to pivot the T-pin to align the oblong head and oblong protrusion with the oblong receiver opening and thereby insert the T-pin into the oblong receiver opening. The lever is then used to pivot the T-pin to secure the oblong head of the T-pin into engagement with a shoulder of the receptacle. The oblong head is pivoted to a position unaligned with the oblong opening while the oblong protrusion remains disposed in the oblong opening. The location of the bushing is adjustable to move the boss within the boss receiving opening in the receptacle fore-and-aft and laterally. The guide pin limits the extent of pivotal movement of the boss and aligns the oblong protrusion of the bushing with the oblong receiver opening in the receptacle.

According to other aspects of this disclosure, the bushing is shiftable relative to the base plate about the guide pin to move the boss within a clearance defined between the boss and the boss receiving opening in the base plate.

The guide pin may be cat's eye shaped with two pointed ends and two sides. The guide opening is sized to receive the two ends and clearance spaces are defined between the two sides and the guide opening.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
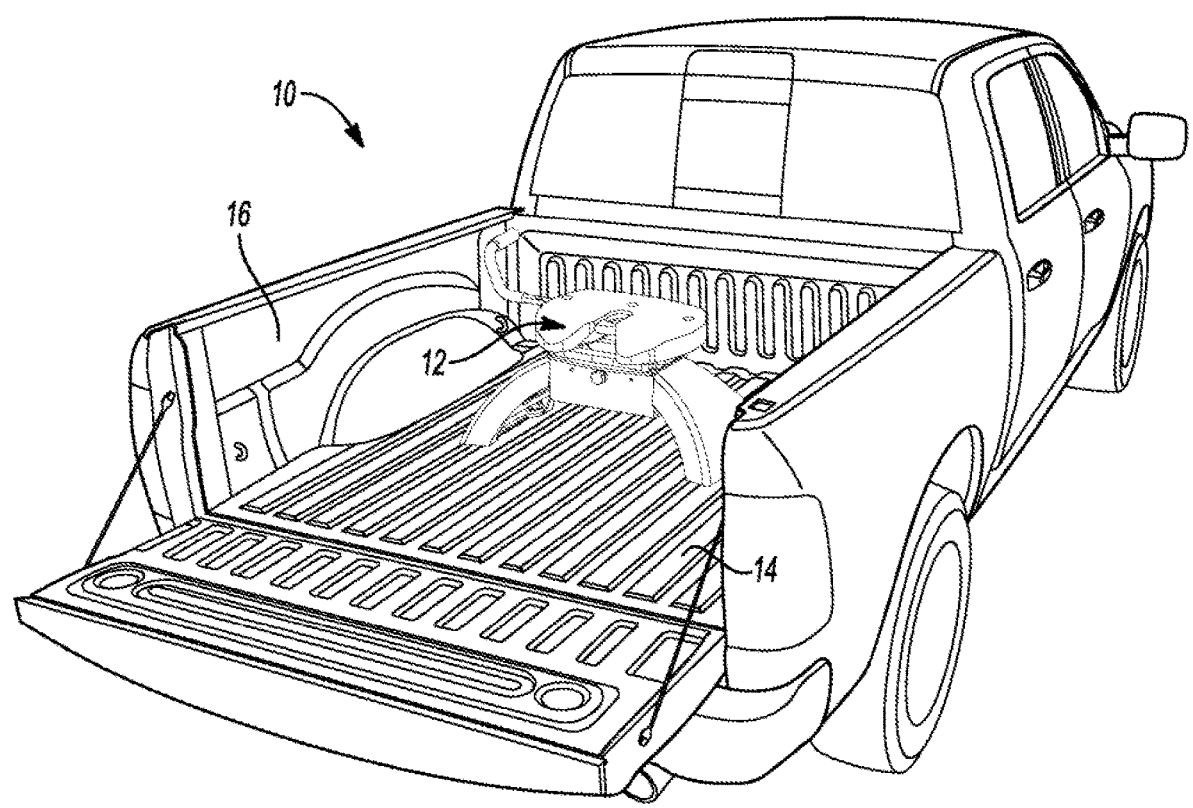
FIG. 1 is a rear perspective view of a pick-up truck with a fifth wheel pedestal attached to the truck bed with an under-bed H-frame mounting arrangement.

Referring to FIG. 1, a pick-up truck 10 is illustrated that includes a fifth wheel hitch pedestal 12 mounted on top of a floor 14 of a bed area 16. The fifth wheel hitch pedestal 12 is attached to a H-shaped frame 18 (partially shown in FIG. 2).

Figure 2:
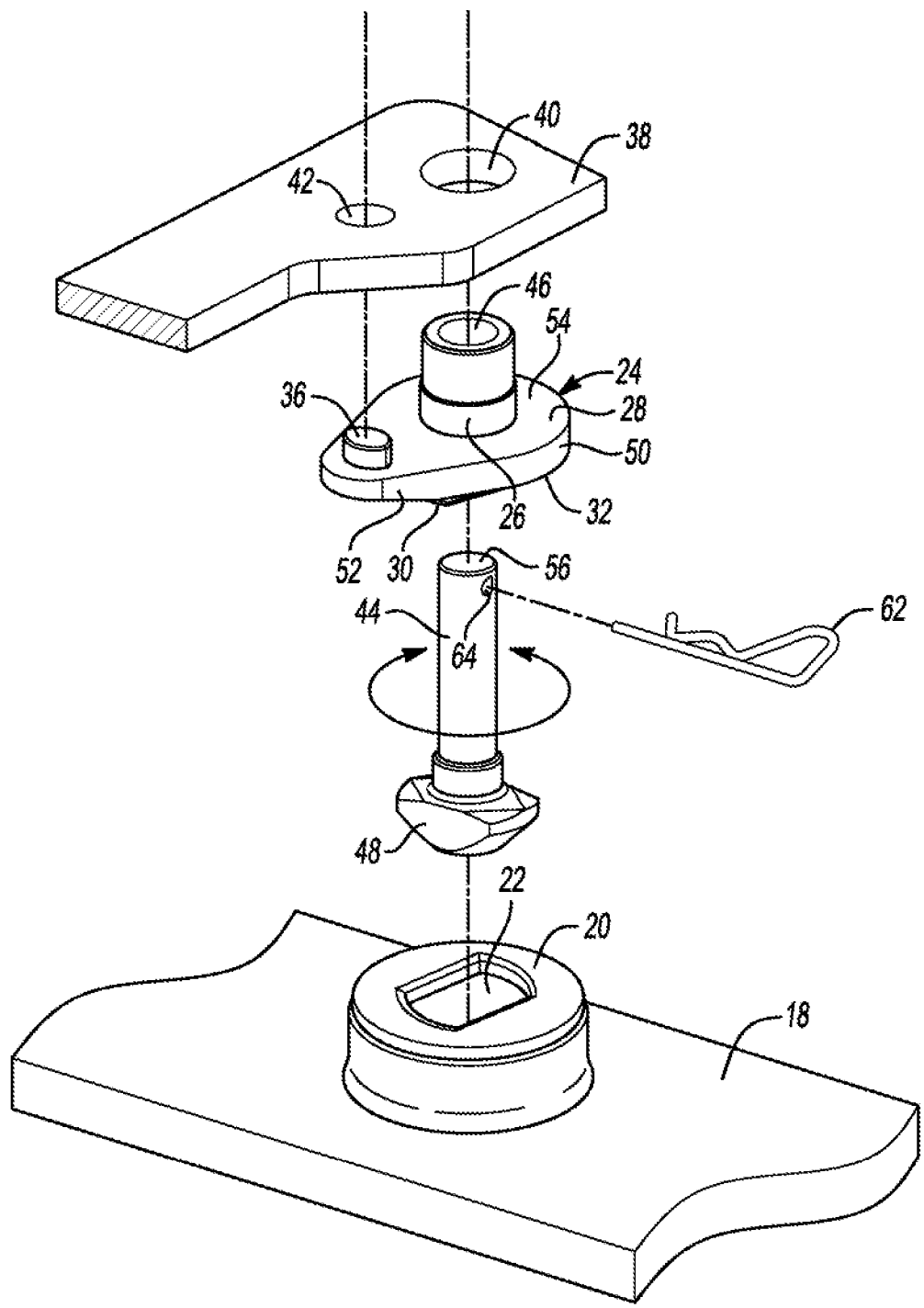
FIG. 2 is an exploded perspective view of a receptacle on an H-frame with a T-pin, bushing, and base plate.

Referring to FIG. 2, The H-shaped frame 18 supports a plurality of puck-shaped receptacles 20 that extend through the floor 14 (shown in FIG. 1). The receptacles 20 each define an oblong opening 22.

A bushing 24 includes a boss 26 on a top side 28 of the bushing 24 and an oblong protrusion 30 on a lower side 32 of the bushing 24. A guide pin 36 is also provided on the top side 28 of the bushing 24. The guide pin 36 is shaped like a cat's eye in a top plan view. The shape of the guide pin 36 facilitates adjusting the location of the boss 26 relative to the receptacles. The guide pin 36 functions to limit pivotal movement of the bushing 24 to align the oblong protrusion 30 with the oblong opening 22.

A base plate 38 is part of the fifth wheel hitch pedestal 12 (shown in FIG. 1). The bushings 24 are attached to the plate 38 to be self-adjusting as the pedestal 12 is assembled to the floor 14. The base plate 38 defines a boss receiving hole 40 and a guide pin receiving hole 42. The base plate 38 receives the boss 26 in the boss receiving hole 40 and the guide pin 36 in the guide pin receiving hole 42 when the fifth wheel pedestal 12 (shown in FIG. 1) is attached to the H-shaped frame 18.

A T-pin 44 is inserted into a central opening 46 defined by the boss 26. An oblong head 48 is provided on a lower end of the T-pin 44. The oblong head 48 is aligned with the oblong protrusion 30 of the bushing 24 when the oblong head 48 and the oblong protrusion 30 are inserted into the oblong opening 22 defined by the receptacle 20. After the oblong head is fully inserted into the receptacle, the head is rotated 90 degrees to secure the fifth wheel hitch pedestal 12 to the floor 14 of the pick-up truck 10 (shown in FIG. 1).

The bushing includes a teardrop shaped plate 50 that includes a V-shaped end 52 and a partially circular portion 54. The shape of the plate 50 may be other than teardrop shaped depending upon the space available for pivoting the plate 50.

The T-pin 44 has a distal end 56 that extends through the central opening 46 defined by the boss 26 that in turn extends through the boss receiving opening in the base plate 38.

Figure 3:
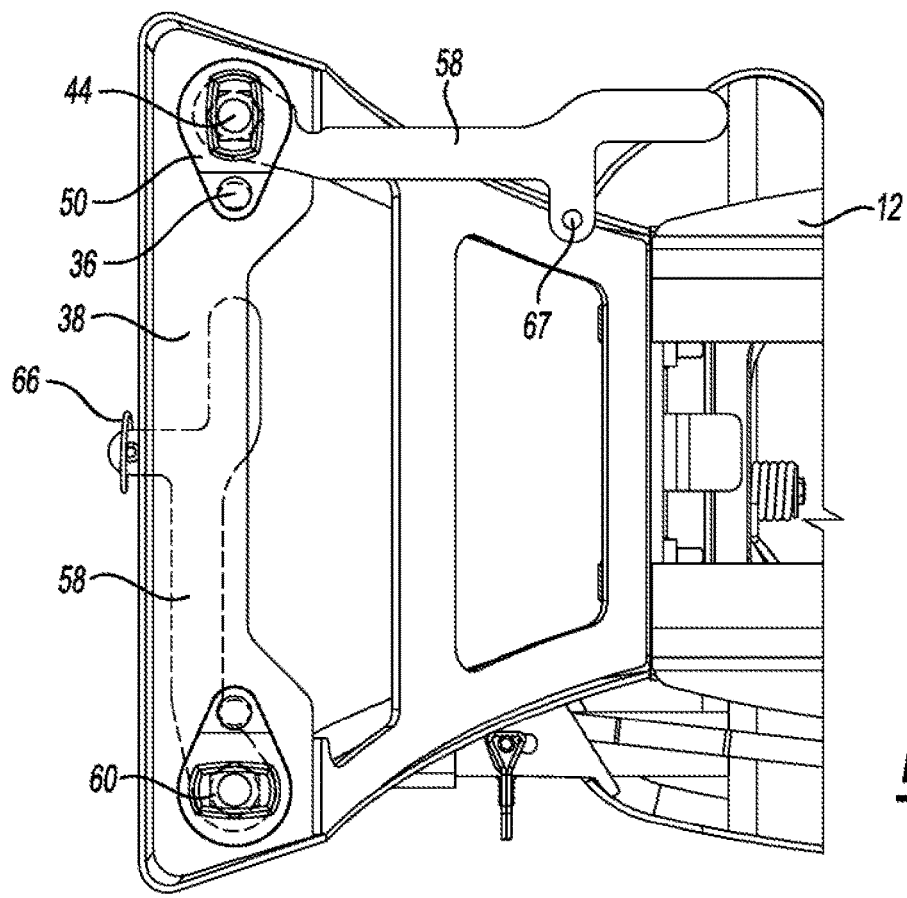
FIG. 3 is a fragmentary bottom plan view of the fifth wheel pedestal showing locking levers with one lever in a locked position and the other lever in an unlocked position.

Referring to FIG. 3, the fifth wheel pedestal 12 is shown with two locking levers 58 with one locking lever 58 in a locked position and another locking lever 58 in an unlocked position. The locking levers 58 are assembled above the base plate 38. The locking levers are attached to a collar 60 that is assembled over the distal end 56 of the T-pin 44. A lynch pin 62 is inserted into an opening 64 (shown in FIG. 2) defined by the T-pin to secure the locking lever 58 to the T-pin 44. The lever 58 is selectively pivoted to pivot the oblong head 48 of the T-pin 44 between the locked and unlocked positions. A locking pin 66 is inserted into a hole 67 in each of the locking levers 58 to prevent the locking levers from moving after the T-pin is moved to the locking position. The T-pin 44 in the upper part of FIG. 3 is in the unlocked position. The T-pin 44 is shown in the locked position in the lower part of FIG. 3. The teardrop shaped plate 50 is fixed to the base plate 38 and does not pivot with the locking levers 58.

Figure 4:
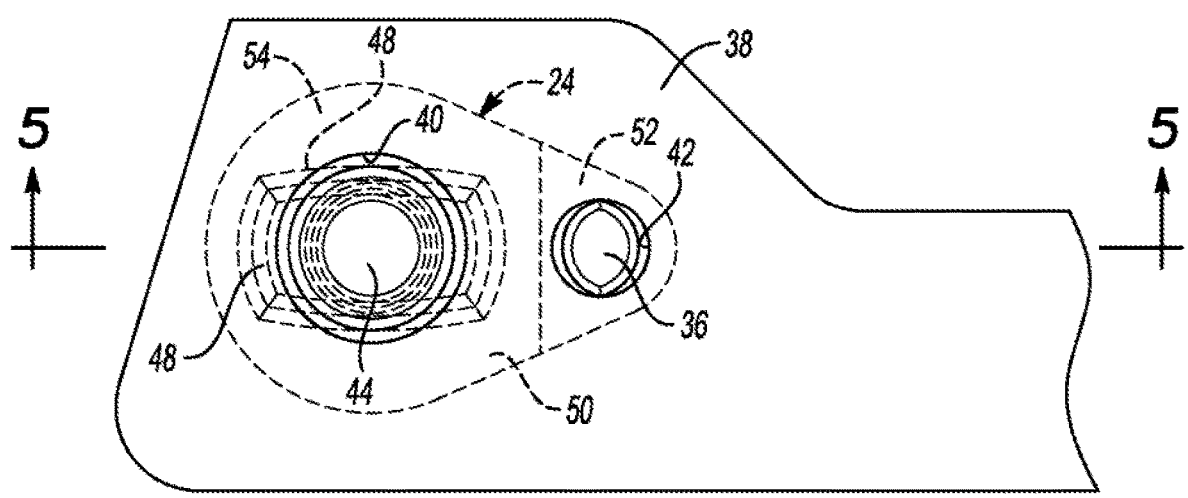
FIG. 4 is a fragmentary plan view of a base plate shown with the T-pin and bushing.
Figure 5:
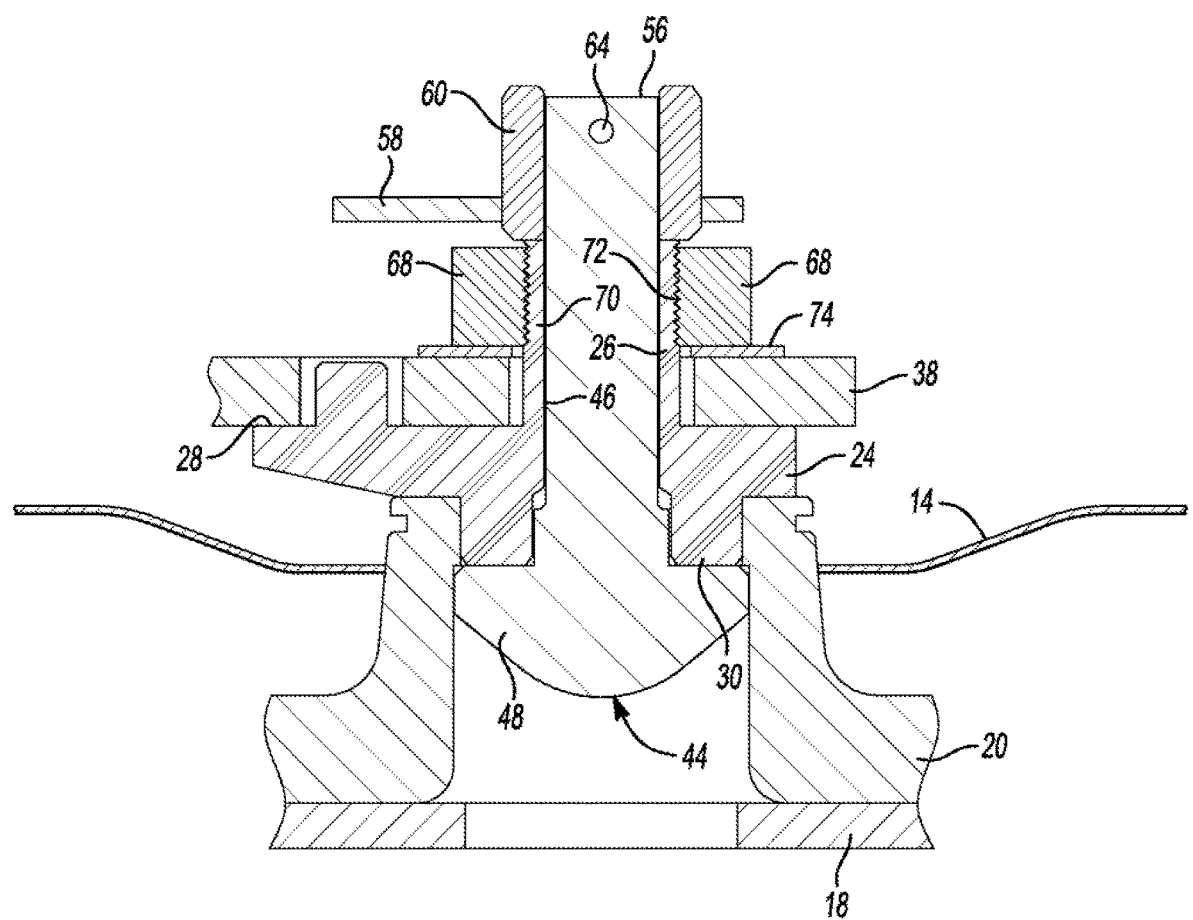
FIG. 5 is a cross-section view taken along the line 5-5 in FIG. 4 with the T-pin in the unlocked position.

Referring to FIGS. 4 and 5, the base plate 38 is shown with the bushing 24 assembled below the base plate 38. The bushing 24 is shown with the T-pin 44 extending through the boss receiving hole 40. The guide pin 36 is shown extending through the guide pin receiving hole 42. The guide pin 36 is provided on the V-shaped portion of the plate 50. The boss 26 is provided on the partially circular portion 54 of the teardrop shaped plate 50. The T-pin 44 is inserted through the central opening, 46 in the boss 26.

Figure 6:
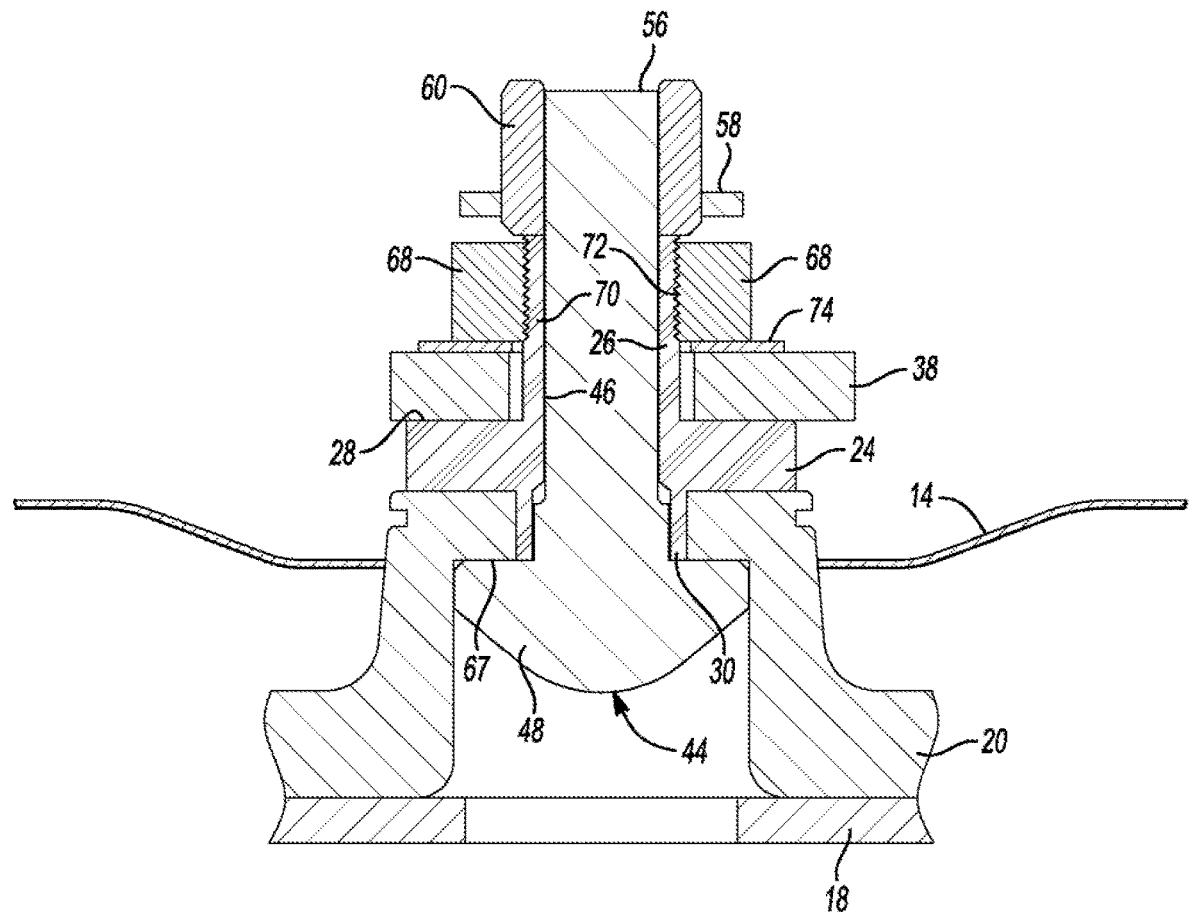
FIG. 6 is a cross-section view rotated 90 degrees about the T-pin from the section of FIG. 5 with the T-pin also being pivoted to the locked position.

Referring to FIGS. 5 and 6, the receptacles 20 extend through the floor 14 and are either assembled to or formed on the H-shaped frame 18. The bushing 24 is placed on the receptacle 20 with the oblong head of the T-pin 44 aligned with the oblong protrusion 30 in FIG. 5 in the assembly/disassembly, or unlocked position. In FIG. 6, the view is rotated 90 degrees about the central axis of the T-pin 44 and the T-pin 44 is pivoted 90 degrees to the locked position. The oblong head 48 of the T-pin 44 when rotated 90 degrees engages a shoulder 67 provided on a lower surface of the receptacle 20.

A jam nut 68 is fastened to an externally threaded portion 70 of the boss 26 with the jam nut 68 having an internally threaded portion 72. The jam nut secures the bushing 24 to the base plate 38 together with a washer 74 that is disposed between the jam nut 68 and the base plate 38.

The locking lever 58 is attached to the collar 60. The collar 60 is affixed to the T-pin 44 by inserting the lynch pin 62 (shown in FIG. 2) into the opening 64 defined in the distal end 56 of the T-pin 44. The locking lever 58 is pivoted to turn the oblong head 48 of the T-pin 44 between the unlocked (assembly/disassembly) position and the locked position.

Referring to FIG. 6, The T-pin 44 is shown after being pivoted by the handle 58 from the position shown in FIG. 5. The oblong head 48 of the T-pin 44 is shown after being rotated under the shoulder 67 of the receptacle 20. The T-pin 44 anchors the base plate 38 of the fifth wheel hitch pedestal 12 to the floor 14 of the pick-up truck 10 (shown in FIG. 1).

Figure 7:
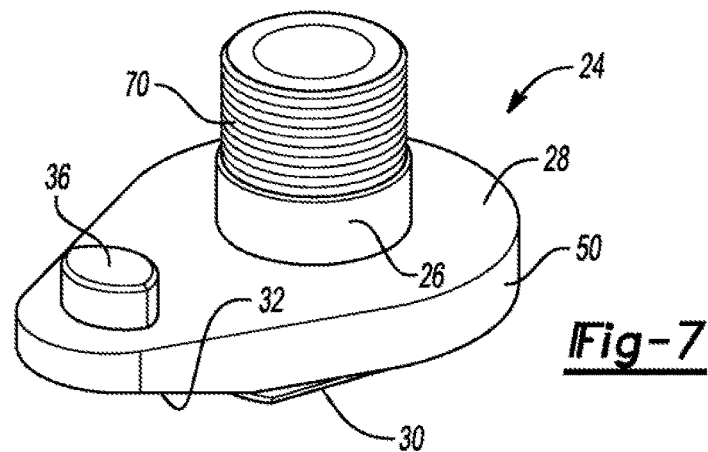
FIG. 7 is a topside perspective view of the bushing.
Figure 8:
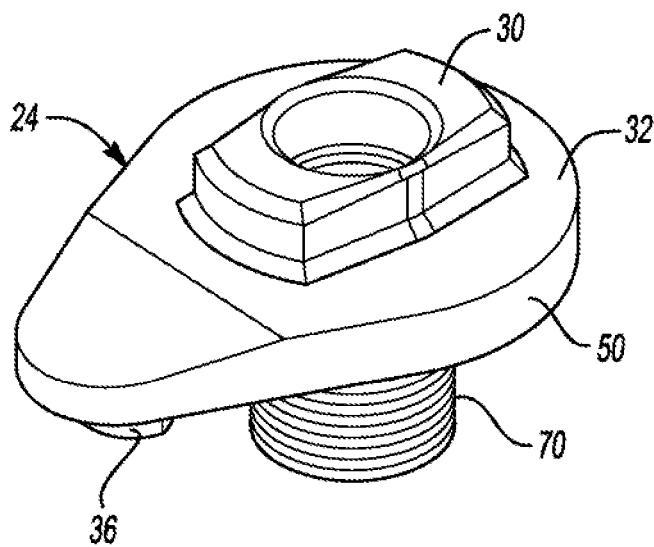
FIG. 8 is a bottom/side perspective view of the bushing.

Referring to FIG. 7, the bushing 24 is shown top side 28 up and in FIG. 8 the bushing 24 is shown with the lower side 32 up. The boss 26 includes the external threaded portion 70. The guide pin 36 is cat's eye shaped and protrudes from the top side of the teardrop shaped plate 50. The oblong protrusion 30 is shown protruding from the lower side 32 of the teardrop shaped plate 50.

Figure 9:
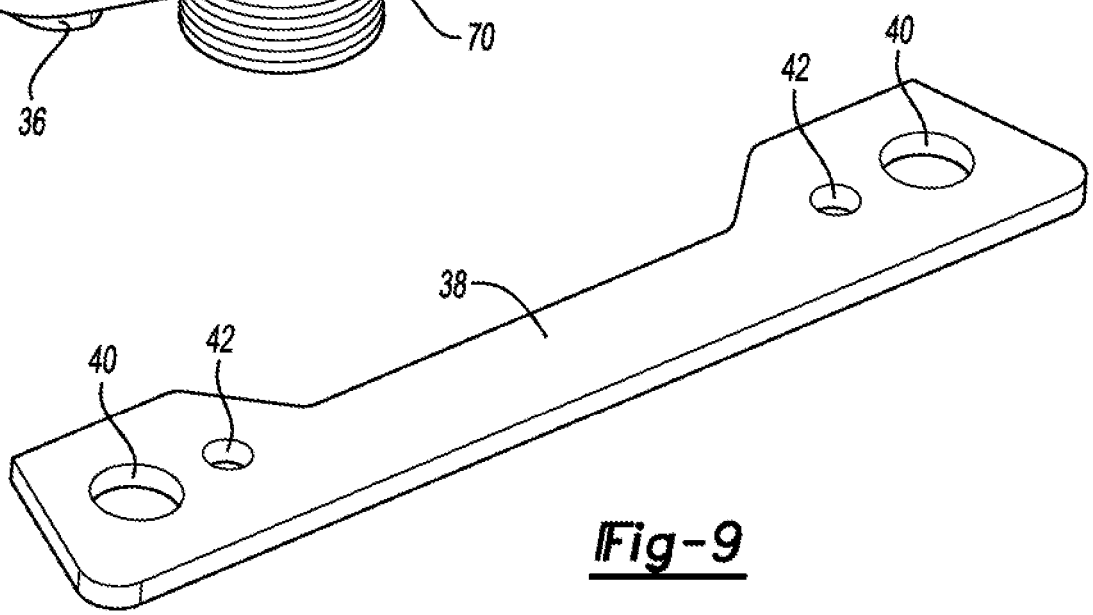
FIG. 9 is a perspective view of the base plate of the fifth wheel pedestal.

Referring to FIG. 9, the base plate 38 provided on right and left sides of the fifth wheel pedestal (shown in FIG. 11 is illustrated in isolation with two boss receiving holes 40 and two guide pin receiving holes 42.

Figure 10:
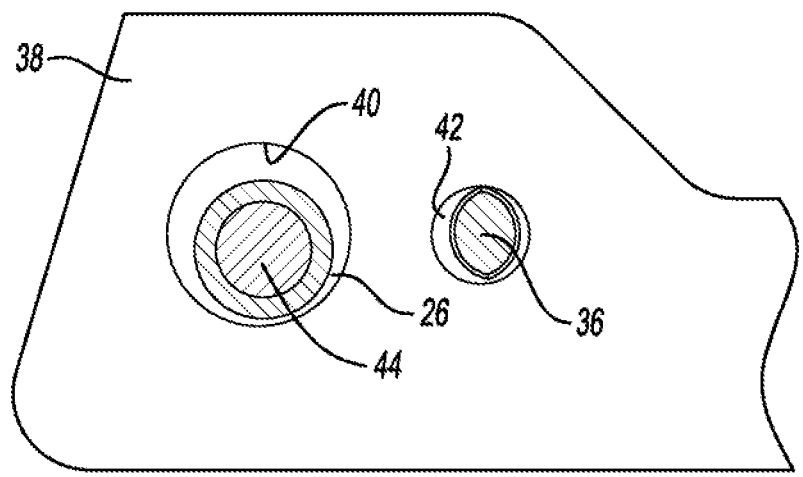
FIG. 10 is a fragmentary top plan view of the base plate with the bushing assembled to the base plate.

Referring to FIG. 10, one end of the base plate 38 is shown that defines the boss receiving hole 40 and guide pin receiving hole 42. The T-pin 44 and boss 26 are shown within the boss receiving hole 40. The guide pin 36 is shown within the guide pin receiving hole 42. The oblong head 48 of the T-pin and oblong protrusion 30 of the bushing 24 are self-adjusting to be aligned with and inserted into the oblong opening 22 of the receptacle 20. The guide pin permits the boss 26 to shift in both the fore-and-aft direction and the lateral direction to accommodate variations in the location of the receptacles 20 relative to the oblong protrusion 30 and oblong head 4$ of the T-pin 44.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A fifth wheel assembly for a truck bed having a receptacle defining an oblong opening attached below the truck bed, comprising:
   a fifth wheel hitch pedestal including a base plate, wherein the base plate defines a first hole and a second hole; and
   a bushing including a boss, wherein the bushing has an oblong protrusion on a lower side and a guide pin that together limit movement of the bushing to orient the oblong protrusion to be received in the oblong opening, wherein the first hole receives the boss and the second hole receives the guide pin.

2. The fifth wheel assembly of claim 1 further comprising:
   a jam nut assembled to a cylindrical protrusion of the boss on top of the base plate, wherein the jam nut is tightened to fix a position of the boss within the first hole defined by the base plate.

3. The fifth wheel assembly of claim 1 further comprising:
   a T-pin received in a central opening defined by the boss, wherein the T-pin is pivoted between a locked position and an unlocked position, wherein the T-pin has an oblong head oriented in alignment with the oblong protrusion when the oblong protrusion is inserted into the oblong opening; and
   a handle secured to the T-pin above the base plate is adapted to pivot the oblong head from the unlocked position to the locked position after passing through the oblong opening, wherein the oblong head engages a lower surface of the receptacle in the locked position.

4. The fifth wheel assembly of claim 1 wherein the bushing includes a teardrop-shaped plate that has a partially circular portion and a V-shaped portion.

5. The fifth wheel assembly of claim 4 wherein the boss is provided on the partially circular portion and the guide pin is provided on the V-shaped portion.

6. A fifth wheel assembly adapted to be assembled to a sub-floor frame having receptacles defining oblong openings, comprising:
   a fifth wheel hitch including a base plate attached to the hitch, wherein the base plate defines a pair of first holes and a pair of second holes;
   a plurality of bushings each including a boss, wherein the boss has a cylindrical protrusion on an upper surface, wherein the bushings each include an oblong protrusion on a lower surface, and wherein the bushings each include a guide pin for controlling movement of the bushings when adjusting a location of the bushings to orient each of the oblong protrusions; and
   a plurality of T-shaped pins, wherein each of the T-shaped pins and each of the oblong protrusions are together received in one of the oblong openings, wherein each of the pair of first holes receives one of the bosses and each of the pair of second holes receives one of the guide pins.

7. The fifth wheel assembly of claim 6 wherein the bosses move within the first holes and the guide pins move within the second holes to limit pivotal movement of the bushings and to align the oblong protrusions with the oblong openings.

8. The fifth wheel assembly of claim 6 further comprising:
   jam nuts each assembled to the cylindrical protrusion of one of the bosses on top of one of the base plates, wherein each jam nut is tightened to fix a position of one of the bosses within one of the first holes defined by one of the base plates.

9. The fifth wheel assembly of claim 6, further comprising:
   the T-pins each received in a central opening defined by each boss, wherein the T-pins are pivoted between a locked position and an unlocked position, the T-pins each have an oblong head oriented in alignment with one of the oblong protrusions when the oblong protrusions are inserted into the oblong openings; and
   handles secured to each T-pin above one of the base plates to pivot the oblong heads from the unlocked position to the locked position after passing through the oblong opening, wherein the oblong heads each engage a lower surface of one of the receptacles in the locked position.

10. The fifth wheel assembly of claim 6 wherein the bushings each include a teardrop-shaped plate that each have a partially circular portion and a V-shaped portion.

11. The fifth wheel assembly of claim 10 wherein the bosses are provided on the partially circular portions and the guide pins are provided on the V-shaped portions.

12. The fifth wheel assembly of claim 6 wherein each of the guide pins are cat's eye shaped each with two pointed ends and two sides, wherein clearance spaces are defined between the two sides of the guide pins and one of the pair of second holes, and wherein the bosses move within the first holes and the guide pins move within the second holes to limit pivotal movement of the bushings and to align the oblong protrusions with the oblong openings.

13. An anchor bushing for assembling a fifth wheel hitch on an upper side of a truck bed to a hitch receptacle bracket that defines an oblong receiver opening, the hitch receptacle bracket being assembled to a lower side of the truck bed, the fifth wheel hitch having a base plate defining a boss receiving opening and a guide pin receiving opening, the anchor bushing comprising:
- a bushing including a plate portion, a boss, and a guide pin at a location spaced from the boss, wherein a lower portion of the bushing includes an oblong protrusion;
- a jam nut assembled to the boss on the upper side of the base plate, wherein the boss is retained in the boss receiving opening of the base plate;
- a T-pin having an oblong head that is assembled into an opening defined by the boss with the oblong head being disposed below the oblong protrusion of the boss, wherein the T-pin has a distal end that extends above the jam nut; and
- a lever adapted to engage the distal end of the T-pin to pivot the T-pin to align the oblong head and oblong protrusion with the oblong receiver opening to insert the T-pin and oblong protrusion into the oblong receiver opening, and wherein the lever pivots the T-pin to secure the oblong head of the T-pin into engagement with a shoulder below the oblong opening to a position the oblong head unaligned with the oblong opening while the oblong protrusion remains disposed in the oblong opening, wherein a location of the bushing is adjustable to move the boss within the boss receiving opening fore-and-aft and laterally, and wherein the boss and the guide pin cooperate to limit pivotal movement of the bushing and facilitate alignment of the oblong protrusion of the boss with the oblong receiver opening in the receptacle.

14. The anchor bushing of claim 13 wherein the bushing is pivotable relative to the base plate about the guide pin to move the boss within a clearance defined between the boss and the boss receiving opening in the base plate.

15. The anchor bushing of claim 13 wherein the guide pin is cat's eye shaped with two ends and two sides, and wherein the guide pin receiving opening is sized to receive the two ends, and wherein clearance spaces are defined between the two sides and the guide pin receiving opening.

16. The anchor bushing of claim 13 wherein the plate portion of the bushing is a teardrop-shaped plate having a partially circular portion and a V-shaped portion.

17. The anchor bushing of claim 16 wherein the boss is disposed on the partially circular portion and the guide pin is disposed on the V-shaped portion.

* * * * *